United States Patent [19]
Goetz

[11] Patent Number: 5,700,030
[45] Date of Patent: Dec. 23, 1997

[54] INFLATOR WITH COMBUSTION CHAMBER PRESSURE REGULATOR

[75] Inventor: George W. Goetz, Rochester Hills, Mich.

[73] Assignee: TRW Vehicle Safety Systems Inc., Lyndhurst, Ohio

[21] Appl. No.: 580,438

[22] Filed: Dec. 27, 1995

[51] Int. Cl.⁶ .................................................. B60R 21/26
[52] U.S. Cl. ........................ 280/736; 280/737; 280/741
[58] Field of Search ................................ 280/736, 737, 280/741

[56] References Cited

U.S. PATENT DOCUMENTS

| | | | |
|---|---|---|---|
| 3,095,901 | 7/1963 | Larson et al. | 280/736 |
| 3,731,843 | 5/1973 | Anderson, Jr. | 222/3 |
| 3,862,767 | 1/1975 | Chute | 280/737 |
| 3,891,233 | 6/1975 | Damon | 280/737 |
| 3,986,456 | 10/1976 | Doin et al. | 102/531 |
| 4,006,919 | 2/1977 | Neuman | 280/736 |
| 4,886,293 | 12/1989 | Weiler et al. | 280/736 |
| 4,950,458 | 8/1990 | Cunningham | 422/164 |
| 5,078,422 | 1/1992 | Hamilton e tal. | 280/736 |
| 5,257,817 | 11/1993 | Cuevas | 280/736 |

FOREIGN PATENT DOCUMENTS 9418034  8/1994  WIPO .

Primary Examiner—Kenneth R. Rice
Attorney, Agent, or Firm—Tarolli, Sundheim, Covell, Tummino & Szabo

[57] ABSTRACT

An apparatus (22) for inflating an inflatable vehicle occupant protection device includes a housing (40) and a wall (86) located in the housing. The wall (86) cooperates with the housing (40) to define a combustion chamber (102). The wall (86) has an opening (88) through which fluid flows from the combustion chamber (102) to inflate the protection device. An ignitable material (120) is located in the combustion chamber (102). The ignitable material (120), upon ignition, increases the pressure in the combustion chamber (102). A valve member (160) is movable between a first position blocking the flow of fluid from the combustion chamber (102) through the opening (88) in the wall (86) and a second position allowing the flow of fluid from the combustion chamber through the opening in the wall. A spring (200) biases the valve member (160) toward the first position. The valve member (160) has a portion (164) against which the pressure in the combustion chamber (102) acts to move the valve member from the first position toward the second position in response to pressure in the combustion chamber increasing above a predetermined pressure.

6 Claims, 3 Drawing Sheets

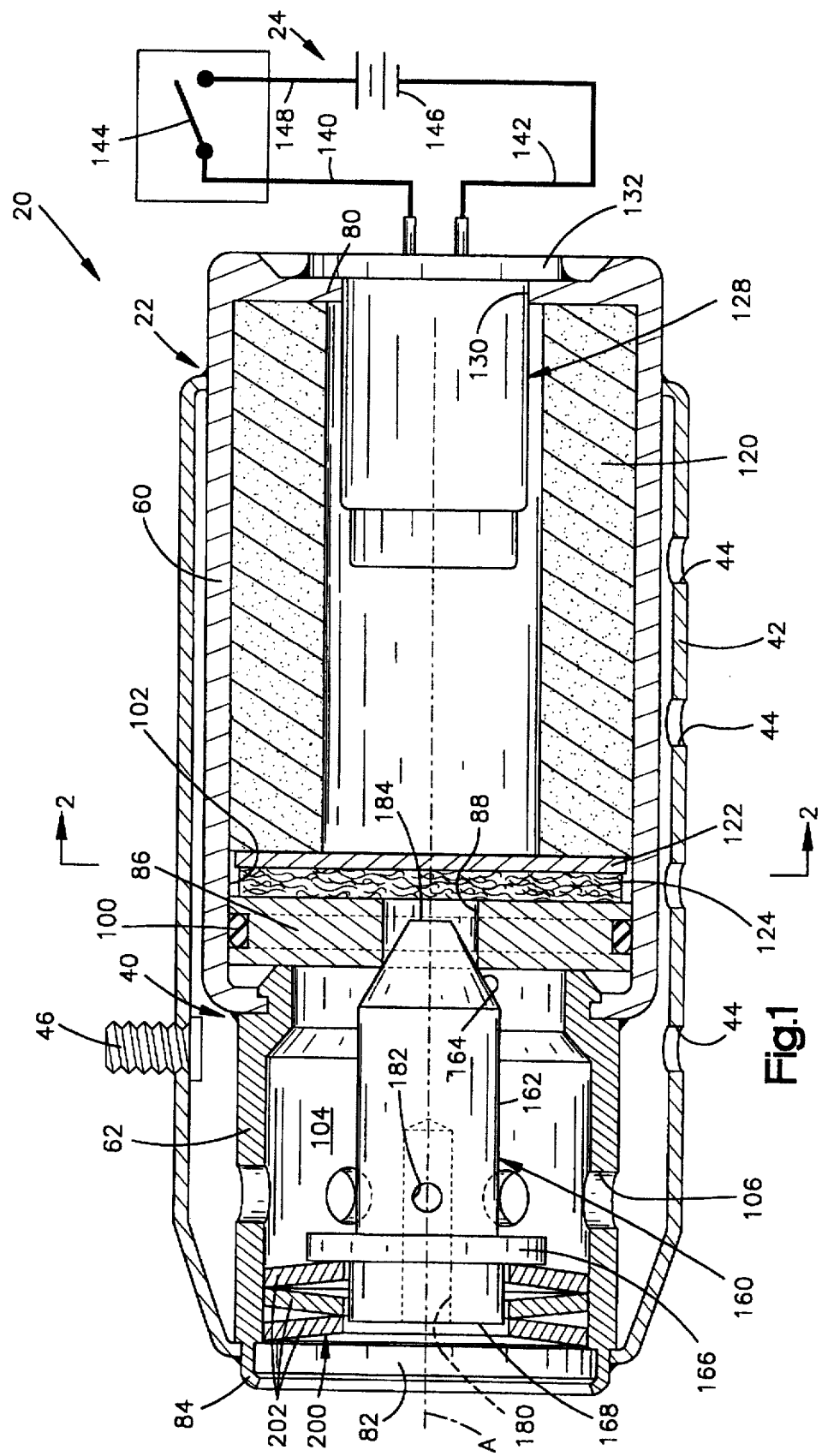

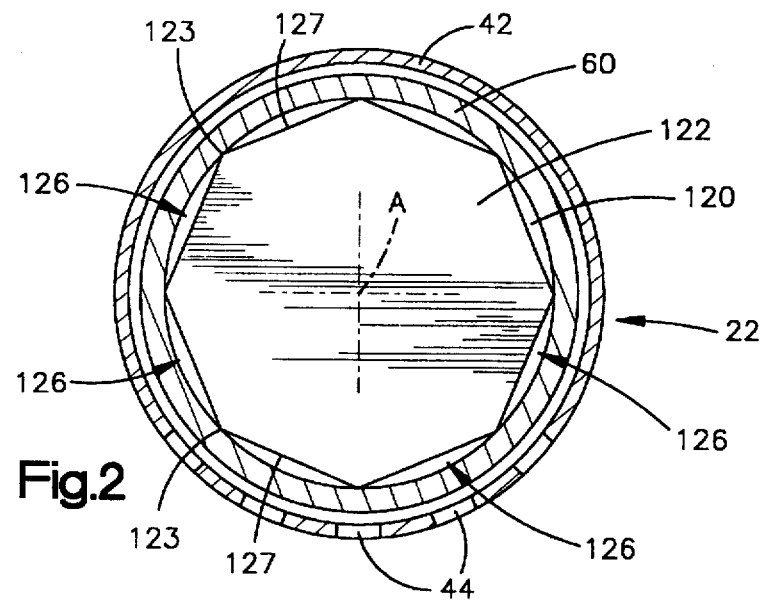
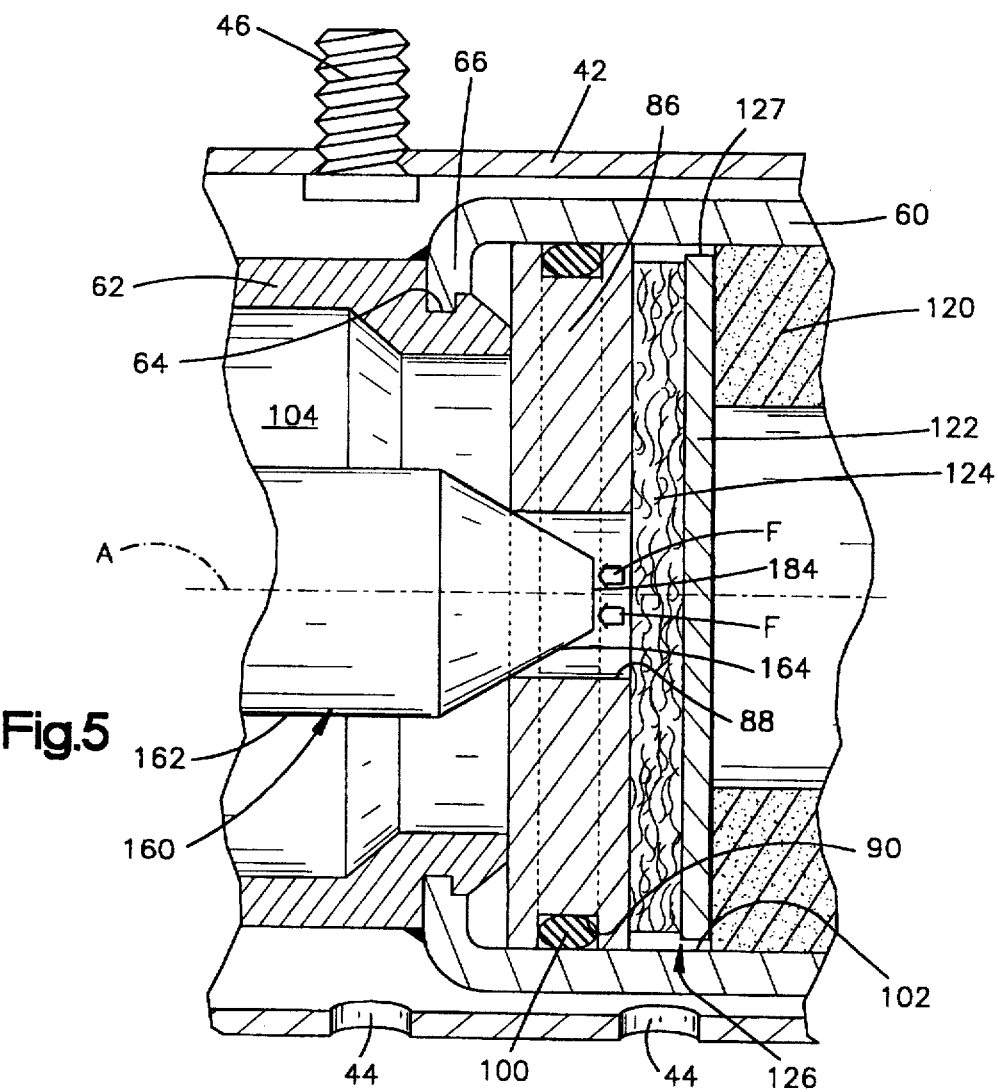

INFLATOR WITH COMBUSTION CHAMBER PRESSURE REGULATOR

BACKGROUND OF THE INVENTION

1. Technical Field

The present invention relates to an inflator which provides inflation fluid for inflating an inflatable vehicle occupant protection device, such as an air bag. In particular, the present invention relates to an inflator which includes an ignitable material.

2. Description of the Prior Art

Air bag inflators are known. One type of air bag inflator includes a housing which stores an ignitable material in a combustion chamber in the housing. The ignitable material, upon ignition, produces combustion products which increase the pressure in the combustion chamber. Fluid flow from the combustion chamber is directed into the air bag to inflate the air bag. The ignitable material burns in an enhanced manner if at least a predetermined pressure, is maintained in the combustion chamber.

SUMMARY OF THE INVENTION

The present invention is directed to an apparatus for inflating an inflatable vehicle occupant protection device. The apparatus includes a housing having a wall which, in part, defines a combustion chamber. The wall has an opening through which inflation fluid can flow from the combustion chamber to inflate the protection device. Ignitable material is located in the combustion chamber to produce, upon ignition, combustion products which increase the pressure in the combustion chamber. A valve member is movable between a first position blocking the flow of fluid from the combustion chamber through the opening in the wall and a second position allowing the flow of fluid from the combustion chamber through the opening in the wall.

A spring biases the valve member toward the first position. The valve member has a portion against which the pressure in the combustion chamber acts to move the valve member from the first position in response to pressure in the combustion chamber increasing to a predetermined pressure. The biasing force of the spring holds the valve member in the first position until pressure in the combustion chamber increases to the predetermined pressure. When the pressure in the combustion chamber reaches the predetermined pressure, the valve begins to move to a position allowing the flow of fluid from the combustion chamber. The valve, thus, maintains at least the predetermined pressure within the combustion chamber during combustion of the ignitable material. By maintaining the predetermined pressure in the combustion chamber, enhanced ignition of the ignitable material is achieved.

The valve member includes a body with a tapered end. At least a part of the tapered end is located within the opening in the wall when the valve member is in the first position. The tapered end of the valve member is preferably frustoconical and the opening in the wall is circular. A portion of a surface defining the frustoconical tapered end engages a portion of a surface defining the opening in the wall to form a fluid-tight seal blocking flow through the opening. When the valve member is in the second position, it cooperates with the opening in the wall to define a flow area through which fluid can flow. The flow area is variable as a function of the pressure in the combustion chamber.

A flow directing plate and a filter are located in the combustion chamber between the ignitable material and the wall of the housing. The filter is located between the wall and the plate. The plate has peripheral portions spaced from the housing to define a flow path between the housing and the periphery of the plate through which fluid can flow prior to flowing through the filter. The fluid, after flowing around the periphery of the plate, flows radially through the filter toward the opening controlled by the valve member.

BRIEF DESCRIPTION OF THE DRAWINGS

Further features and advantages of the present invention will become apparent to those skilled in the art to which the present invention relates from reading the following specification with reference to the accompanying drawings, in which:

FIG. 1 is a schematic sectional view of a vehicle occupant protection system including an inflator embodying the present invention;

FIG. 2 is a sectional view of the inflator of FIG. 1, taken approximately along line 2—2 of FIG. 1;

FIG. 5 is an enlarged longitudinal sectional view of a portion of the inflator of FIG. 1.

DESCRIPTION OF A PREFERRED EMBODIMENT

Figure 3:
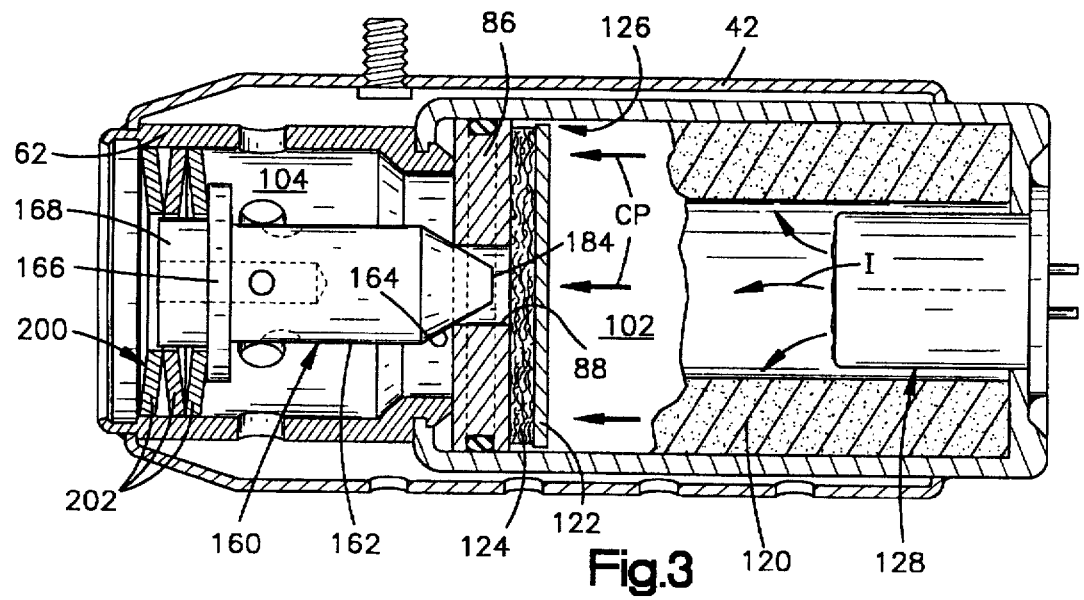
FIG. 3 is a longitudinal sectional view of the inflator of FIG. 1 after actuation.

An inflatable vehicle occupant protection system 20 is illustrated in FIG. 1. The protection system 20 includes an inflator 22 which provides a source of inflation fluid for inflating an inflatable vehicle occupant protection device, such as an air bag (not shown). An actuation circuit 24 provides electrical energy for actuating the inflator 22 to inflate the air bag. The actuation circuit 24 includes structure which senses a vehicle condition indicative of a collision for which inflation of the air bag is desired and provides electrical energy to actuate the inflator 22.

The inflator 22 includes a tubular housing 40 with a longitudinal central axis A. A fluid flow deflector 42 is fixed to and extends coaxially around a portion of the tubular housing 40 of the inflator 22. A plurality of discharge openings 44 extend through the fluid flow deflector 42 to direct inflation fluid from the tubular housing 40 into the air bag. A mounting stud 46 is fixed to the fluid flow deflector 42 and extends from the fluid flow deflector to mount the fluid flow deflector and the inflator 22 to a part of the vehicle.

The housing 40 includes a metal body 60, a metal diffuser 62 attached to the body, and a metal end wall 82 attached to the left end, as viewed in FIG. 1, of the diffuser. An end portion 84 of the diffuser 62 is deformed around a periphery of the end wall 82 to attach the end wall to the diffuser. A groove 64 (FIG. 5) is formed in a right end portion of the diffuser 62, as viewed in FIG. 5. A left end portion 66 of the body 60, as viewed in FIG. 5, is deformed into the groove 64 in the diffuser 62 during assembly. The body 60 and the diffuser 62 are welded together adjacent the groove 64 to further attach and seal the body to the diffuser. The housing 40 further includes a right end wall 80 (FIG. 1) which is formed in one piece with the body 60.

The housing 40 further includes a metal intermediate wall 86 (FIGS. 1 and 5) which is located in the body 60 of the housing and between the right end wall 80 and the left end wall 82. The intermediate wall 86 preferably engages the right end surface, as viewed in FIG. 1, of the diffuser 62 and is secured to the body 60 by suitable means. A circular opening 88 is formed in the center of the intermediate wall 86. The opening 88 has its center located along the axis A of the housing 40. A continuous circumferential groove 90 is formed in the outer periphery of the intermediate wall 86. An elastomeric seal 100 is located within the groove 90 in the intermediate wall 86 and engages an inner cylindrical surface of the body 60 to form a fluid seal between the intermediate wall and the body.

The intermediate wall 86 cooperates with the inner circumferential surface of the body 60 to define a combustion chamber 102 (FIG. 1) on one side of the intermediate wall. The intermediate wall 86 also cooperates with the diffuser 62 to define a diffuser chamber 104 on the other side of the intermediate wall. A plurality of diffuser openings 106 extend through the diffuser 62 to provide flow paths between the diffuser chamber 104 and the interior of the fluid flow deflector 42.

Ignitable material 120 is located in the combustion chamber 102 in the body 60. The ignitable material 120 may be of any suitable composition. The ignitable material 120 produces, upon ignition, combustion products CP (FIGS. 3 and 4) including fluid, heat, hot particles and particulates. It should be apparent that the body 60 could store a fluid under pressure in the chamber 102 which is heated by the combustion products CP to increase the pressure of the stored fluid.

A metal plate 122 (FIGS. 1, 2 and 5) and a filter 124 are also located in the combustion chamber 102. The plate 122 and the filter 124 are located between the intermediate wall 86 and the ignitable material 120. The filter 124 is located between the intermediate wall 86 and the plate 122. The filter 124 is made from a suitable material, such as metal wire mesh screen, steel wool, glass wool or a combination of the mesh screen and steel wool and/or glass wool. The filter 124 can compress during assembly of the inflator 22 to assure that no axial clearance or gap exists between the ignitable material 120, plate 122, filter, and intermediate wall 86.

The plate 122 preferably has an octagonal shaped periphery, as illustrated in FIG. 2. Points 123 of the plate 122, which are the radially outermost portions of the plate relative to the axis A, engage the inner surface of the body 60. Spaces 126 are formed between planar peripheral surfaces 127 of the plate 122 and the inner cylindrical surface of the body 60. The plate 122 has a relatively large surface which faces the ignitable material 120. Combustion products CP strike the plate 122 and are deflected radially toward the spaces 126.

The spaces 126 define flow paths through which combustion products CP (FIG. 3) produced by combustion of the ignitable material 120 can flow to enter the filter 124 at locations adjacent the body 60. In order to reach the opening 88 in the intermediate wall 86, the combustion products CP must then flow through the filter 124 a distance which is approximately equal to the radius of the filter. The filter 124 cools the combustion products CP and removes hot particles and particulates produced by combustion of the ignitable material 120.

An igniter 128 extends through an opening 130 in the right end wall 80 of the body 60. The igniter 128 has a flange 132 which is fixed to the right end wall 80 by a continuous circumferential weld. Wires 140, 142 (FIG. 1) of the actuation circuit 24 are connected with the igniter 128 to conduct electrical energy to the igniter 128. The wire 140 is in electrical communication with a normally open sensor switch 144 of the actuation circuit 24. The wire 142 is electrically connected with a power source 146, such as a battery or a capacitor, of the actuation circuit 24. The sensor switch 144 is connected with the power supply 146 by a wire 148 to complete the electrical circuit 24 when the sensor switch is closed.

Figure 4:
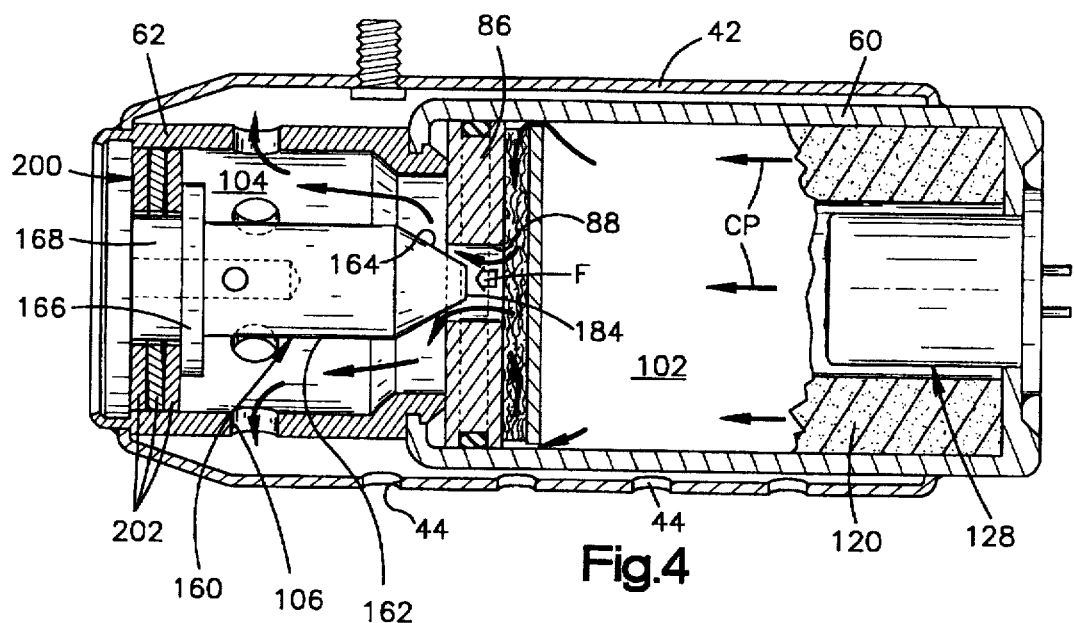
FIG. 4 is a view similar to FIG. 3 with parts in different positions.

The sensor switch 144 closes in response to a vehicle encountering a condition indicative of a collision for which inflation of the air bag is desired. If the condition is above a predetermined threshold, the sensor switch 144 closes. When the sensor switch 144 closes, electrical energy is directed to the igniter 128 to actuate the igniter. The actuated igniter 128 produces initiating combustion products I, including heat and hot particles, as illustrated in FIG. 3. The initiating combustion products I contact and ignite the ignitable material 120 located in the combustion chamber 102.

Upon ignition and combustion of the ignitable material 120 in the combustion chamber 102, the combustion products. CP are produced, including heat, hot particles, inflation fluid in the form of a gas, and particulates. Combustion of the ignitable material 120 increases the pressure inside of the combustion chamber 102.

A valve member 160 is located in the diffuser chamber 104. The valve member 160 is an elongate member having a longitudinal central axis located along the axis A. The valve member 160 includes a body 162, a tapered end 164, a shoulder 166 and a base 168. The valve member 160 also includes a central passage 180 extending axially approximately halfway through the body 162. A plurality of passages 182 extend radially from the central passage 180 to communicate the left end of the body 162, as viewed in FIG. 1, with the diffuser chamber 104.

The body 162 of the valve member 160 has a cylindrical shape. The tapered end 164 is an integral part of the body 162 and is located at the right end of the body, as viewed in FIG. 1. The tapered end 164 (FIG. 5) of the valve member 160 is preferably frustoconical in shape. The tapered end 164 includes a planar surface 184 which extends normal to the axis A of the housing 40.

The tapered end 164 extends at least partially into the opening 88 in the intermediate wall 86. A surface defining the tapered end 164 engages a surface defining the opening 88 in the intermediate wall along a continuous circumferential line to seal the opening and block inflation fluid from flowing from the combustion chamber 102, through the opening, and into the diffuser chamber 104.

The base 168 is part of the body 162 and is located at the left end of the body. The shoulder 166 is annular and is located on the body 162 adjacent the base 168. The shoulder 166 projects radially outward from the body 162.

A spring assembly 200 is located in the diffuser chamber 104 at an end of the valve member 160. The spring assembly 200 comprises a stack of annular cup-shaped spring members, such as Bellville springs 202. The base 168 extends through a central opening in each spring 202. The springs 202 cooperate with the base 168 to center and retain the valve member 160 along the axis A.

The spring assembly 200 engages the left end plate 82 of the housing 40 and the shoulder 166 of the valve member 160 to urge the valve member in a direction away from the left end plate. The spring assembly 200 biases the valve member 160 toward a closed position in which the tapered end 164 of the valve member 160 closes the opening 88 in the intermediate wall 86 and blocks the flow of inflation fluid from the combustion chamber 102 through the opening.

The force of the spring assembly 200 biasing the valve member 160 toward the closed position is overcome when a force F (FIG. 5) provided by the pressure in the combustion chamber 102 increases due to combustion of the ignitable material 120. When the pressure in the combustion chamber 102 reaches a predetermined pressure, the force F which acts on the end surface 184 and a portion of the surface of the tapered end 164 of the valve member 160 becomes greater than the biasing force of the spring assembly 200. The valve member 160 moves in a direction against the biasing force of the spring assembly 200 to an open position in which the tapered end 164 no longer engages the surface defining the opening 88 in the intermediate wall 86. Inflation fluid can then flow from the combustion chamber 102 through the opening 88 in the intermediate wall 86. The inflation fluid then flows into the diffuser chamber 104, into the deflector 42 and into the air bag to inflate the air bag.

The tapered end 164 of the valve member 160 in the open position cooperates with the surface defining the opening 88 in the intermediate wall 86 to provide a flow area or nozzle. The flow area is variable as a function of pressure in the combustion chamber 102. As the pressure in the combustion chamber 102 increases, the tapered end 164 of the valve member 160 moves in a direction to the left, as viewed in FIG. 4, so the flow area increases.

In operation, the sensor switch 144 (FIG. 1) closes in response to a vehicle situation in which inflation of the air bag is desired. The closed sensor switch 144 completes the actuation circuit 24 to provide electrical energy from the power supply 146 to the igniter 128. The igniter 128 is energized, as viewed in FIG. 3, to produce initiating combustion products I which contact and ignite the ignitable material 120 when the valve member 160 is in the closed position. The igniter 128 is energized to ignite the ignitable material 120 when the valve member 160 is in the closed position blocking flow through the opening 88 in the intermediate wall 86. The ignitable material 120, when ignited, produces combustion products CP which increase the pressure in the combustion chamber 102.

Some of the combustion products CP plate out onto the surface of the plate 122. Other combustion products CP flow around the peripheral edges 127 of the plate 122 and into the filter 124 at a location adjacent the body 60. The combustion products CP flow radially through the filter 124 a distance which is approximately equal to the radius of the cylindrical inner surface of the body 60.

When the ignitable material 120 first ignites, no flow through the opening 88 occurs because the valve member 160 is in a closed position. As pressure within the combustion chamber 102 increases to the predetermined pressure, the force F acting on the end surface 184 and the surface defining the tapered end 164 of the valve member 160 overcomes the biasing force of the spring assembly 200. The valve member 160 then moves to the left, as viewed in FIG. 4, to an open position. Fluid then flows from the combustion chamber 102 to the diffuser chamber 104 through the flow area between the tapered portion 164 and the surface defining the opening 88. The flow area between the tapered portion 164 and the surface defining the opening 88 varies as a function of pressure in the combustion chamber 102.

The valve member 160 regulates the flow of combustion products CP including inflation fluid from the combustion chamber 102, through the opening 88 in the intermediate wall 86 and into the diffuser chamber 104. Such control of the flow of inflation fluid from the combustion chamber 102 assures that a predetermined pressure is present in the combustion chamber during combustion of the ignitable material 120. Maintaining a predetermined pressure in the combustion chamber 102 during combustion of the ignitable material 120 enhances the combustion of the ignitable material.

The valve member 160 ensures that the pressure in the combustion chamber 102 will initially increase to a predetermined pressure of about 5,000 p.s.i., for example. As the pressure in combustion chamber 102 increases above the predetermined pressure of about 5,000 p.s.i., the valve member 160 will move to an open position to allow fluid flow into the air bag. The higher the pressure in combustion chamber 102 above the predetermined pressure, the greater the movement of the valve member 160 in a direction away from the closed position and the greater the flow area between the surface defining the opening 88 and the tapered end 164 of the valve member 160. If the pressure in combustion chamber 102 drops below the predetermined pressure of about 5,000 p.s.i. even though the ignitable material 120 is burning, the valve member 160 will again close. Thus, it should be understood that the valve member 160 tends to cause the pressure in chamber 102 to be relatively constant during the ignition of the ignitable material 120. This results in the ignitable material 120 burning effectively and completely due to the fact that it is burning under pressure.

The fluid pressure in the area to the left of the spring assembly 200 and the shoulder 166 and located in the left end of the diffuser chamber 104, as viewed in FIG. 1, is allowed to vent through the central passage 180 and the radial passages 182 in the valve member 160 to the diffuser chamber. Such venting assures that no fluid damping of movement of the valve member 160 occurs. Thus, inflation fluid from the combustion chamber 102 can flow through the opening 88 in the intermediate wall 86 and into the diffuser chamber 104. Inflation fluid then flows from the diffuser chamber 104 through the diffuser openings 106 and into the fluid flow deflector 42 around the housing 40. Inflation fluid in the fluid flow deflector 42 may then flow through the discharge openings 44 and into the air bag to inflate the air bag. The inflated air bag extends between an occupant of the vehicle and parts of the vehicle in order to help protect the occupant from forcefully striking parts of the vehicle.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protection device, said apparatus comprising:

a housing having a wall at least partially defining a combustion chamber, said wall having an opening through which fluid flows from the combustion chamber to inflate the protection device;

ignitable material located in the combustion chamber to produce, upon ignition, combustion products to increase the pressure in the combustion chamber;

a valve member movable between a first position blocking flow of fluid from the combustion chamber through the opening in said wall and a second position allowing the flow of fluid from the combustion chamber through the opening in said wall;

biasing means urging said valve member toward the first position, said valve member having a portion against which the pressure in the combustion chamber acts to move said valve member from the first position toward the second position in response to pressure in the combustion chamber increasing above a predetermined pressure; and a flow directing plate and a filter in the combustion chamber between said ignitable material and said wall of said housing, said filter being located between said wall and said plate, said plate having a peripheral edge surface spaced from said housing to define a fluid flow path between said housing and said peripheral edge surface of said plate.

2. An apparatus for inflating an inflatable vehicle occupant protection device, said apparatus comprising:

a housing;

a wall located within said housing, said wall cooperating with said housing to define a combustion chamber on one side of said wall, said wall having an opening through which fluid flows from the combustion chamber to inflate the protection device;

ignitable material which is located in the combustion chamber and which produces, upon ignition, combustion products including pressurized inflation fluid;

a valve member movable between a first position blocking the flow of fluid from the combustion chamber through the opening in said wall and a second position allowing the flow of fluid from the combustion chamber through the opening in said wall;

a spring biasing said valve member toward the first position, said valve member having a portion against which the pressure in the combustion chamber acts to move said valve member from the first position toward the second position in response to pressure in the combustion chamber increasing above a predetermined pressure, the biasing force of said spring holding said valve member in the first position to maintain the predetermined pressure in the combustion chamber during combustion of said ignitable material until pressure in the combustion chamber above the predetermined pressure is relieved; and a flow directing plate and a filter in the combustion chamber between said ignitable material and said wall of said housing, said filter being located between said wall and said plate, said plate having a peripheral edge surface spaced from said housing to define a fluid flow path between said housing and said peripheral edge surface of said plate.

3. An apparatus for inflating an inflatable vehicle occupant protection device, said apparatus comprising:

a housing defining a combustion chamber having an exit opening;

ignitable material located in the combustion chamber to produce, upon ignition, combustion products to increase the pressure in said combustion chamber; and closure means for blocking fluid from exiting said combustion chamber through said exit opening until said pressure increases to a predetermined pressure under the influence of said combustion products;

said closure means including a valve member having a closed position closing said exit opening;

said closure means further including a spring which holds said valve member in said closed position against the force of said pressure while said pressure is increasing toward said predetermined pressure, said valve member being movable from said closed position to an open position against a bias of said spring under the influence of said pressure when said pressure has increased to said predetermined pressure.

4. An apparatus as defined in claim 3 wherein said spring urges said valve member back toward said closed position against said force of said pressure continuously while fluid is exiting said combustion chamber through said exit opening, said spring moving said valve member back to said closed position if said pressure drops below said predetermined pressure.

5. An apparatus as defined in claim 3 wherein said valve member is supported for movement in a diffuser chamber having a plurality of diffuser outlet openings, said apparatus further comprising vent means for preventing fluid damping of movement of said valve member between said positions.

6. An apparatus for inflating an inflatable vehicle occupant protection device, said apparatus comprising:

a housing having a wall at least partially defining a combustion chamber, said wall having an opening through which fluid flows from said combustion chamber to inflate the protection device; and a flow directing plate and a filter in said combustion chamber between said ignitable material and said wall of said housing, said filter being located between said wall and said plate, said plate having peripheral edge surface spaced from said housing to define a fluid flow path between said housing and said peripheral edge surface of said plate.

* * * * *